United States Patent
Kim et al.

(10) Patent No.: US 11,185,861 B2
(45) Date of Patent: Nov. 30, 2021

(54) MULTISTAGE DETERMINISTIC LATERAL DISPLACEMENT DEVICE FOR PARTICLE SEPARATION

(71) Applicant: International Business Machines Corporation, Armonk, NY (US)

(72) Inventors: Sung-Cheol Kim, New York, NY (US); Stacey Gifford, Fairfield, CT (US); Joshua T. Smith, Croton on Hudson, NY (US); Benjamin Wunsch, Mt. Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 705 days.

(21) Appl. No.: 16/007,107

(22) Filed: Jun. 13, 2018

(65) Prior Publication Data

US 2019/0381505 A1    Dec. 19, 2019

(51) Int. Cl.
*B01L 3/00* (2006.01)
*B01F 13/00* (2006.01)
(Continued)

(52) U.S. Cl.
CPC ........ *B01L 3/502761* (2013.01); *B01D 29/44* (2013.01); *B01F 13/0062* (2013.01);
(Continued)

(58) Field of Classification Search
CPC ........... B01F 13/0062; B01L 3/507261; B01L 3/502707; B01L 2300/0861;
(Continued)

(56) References Cited

U.S. PATENT DOCUMENTS 6,881,315 B2 * 4/2005 Iida ................... B01L 3/502761
204/164
8,783,466 B2 * 7/2014 Han .................. B01L 3/502746
209/155

(Continued)

FOREIGN PATENT DOCUMENTS

CN         103834558 A      6/2014

OTHER PUBLICATIONS

Huang et al., "Continuous Particle Separation Through Deterministic Lateral Displacement," Science vol. 304 14 (May 2004), pp. 987-990.

(Continued)

*Primary Examiner* — Charles A Fox
*Assistant Examiner* — Kalyanavenkateshware Kumar
(74) *Attorney, Agent, or Firm* — Cantor Colburn LLP; Stosch Sabo (57)    ABSTRACT

Multistage deterministic lateral displacement devices, methods of forming the devices, and methods of separating a fluid mixture including particles having three or more particle sizes generally include a first module and at least one additional module. Each module includes a condenser portion and a separate portion. The condenser portion is generally configured to focus a streamline of all particles to a center of a channel whereas the separator separates the streamline of all particles into two different streamlines. One of the streamlines focuses the largest particles in the fluid mixture along a sidewall of the channel and the other streamline of smaller particles is between opposing sidewalls that define the channel. Each additional module can be used to further separate the largest particles remaining in the fluid mixture from the smaller particles.

19 Claims, 6 Drawing Sheets

(51) Int. Cl.
  *B01D 29/44* (2006.01)
  *G01N 1/40* (2006.01)
(52) U.S. Cl.
  CPC .......... *B01L 3/502707* (2013.01); *G01N 1/40* (2013.01); *B01L 2200/027* (2013.01); *B01L 2200/0652* (2013.01); *B01L 2300/0861* (2013.01)
(58) Field of Classification Search
  CPC ....... B01L 2300/0864; B01L 2200/027; B01L 2200/0652; B01L 2400/086; B01D 29/44; G01N 1/40; G01N 15/0255
  See application file for complete search history.

(56) References Cited

U.S. PATENT DOCUMENTS

| | | | |
|---|---|---|---|
| 9,470,679 B2 | 10/2016 | Leshansky et al. | |
| 9,789,235 B2 | 10/2017 | Gifford et al. | |
| 9,892,225 B2 | 2/2018 | Tirapu Azpiroz et al. | |
| 2007/0026469 A1* | 2/2007 | Fuchs | B01L 3/502707 435/7.23 |
| 2010/0006479 A1* | 1/2010 | Reichenbach | G01N 15/1056 209/132 |
| 2015/0361489 A1* | 12/2015 | Soper | B01L 3/502761 506/4 |
| 2016/0144378 A1 | 5/2016 | Huang et al. | |
| 2016/0144406 A1 | 5/2016 | Astier et al. | |
| 2016/0250637 A1 | 9/2016 | Neild et al. | |
| 2018/0038876 A1 | 2/2018 | Arai | |

OTHER PUBLICATIONS

Liu, et al., "High-Throughput Particle Manipulation Based on Hydrodynamic Effects in Microchannels," Micromachines (2017) vol. 8, No. 73; doi:10.3390/mi8030073; 22 pages.

* cited by examiner

MULTISTAGE DETERMINISTIC LATERAL DISPLACEMENT DEVICE FOR PARTICLE SEPARATION

BACKGROUND

This invention generally relates to microfluidic devices and methods for particle separation. More particularly, the present invention relates to a multistage condenser and deterministic lateral displacement device for separating multiply sized particles having greater than two different diameters.

In microfluidic devices, the fluid behaves according to the laws of laminar flow, which has high viscosity and no inertia motion. Due to the lack of inertia motion, the flow has time reversibility that makes the mixing of two parallel flow streams challenging on a practical timescale. Adjacent flow streams can be used to compress and "sculpt" a liquid stream without diluting the contents (e.g. particles, analytes) of the stream itself. This method is called hydrodynamic focusing and has been used to generate concentrated "jets" of fluid flow, with narrow cross-sections, for microfluidic applications such as emulsion formation and localized sample feeding. This method has the ability to concentrate a stream of fluid or sample, thus reducing diffusion effects, increasing the local density of analytes, and allowing controlled spatial placement of the stream within a fluidic channel.

SUMMARY

Embodiments of the present invention are generally directed to microfluidic devices, methods of separating at least three different sized particles from a fluid mixture, and methods of forming a multistage deterministic lateral displacement device. A non-limiting example of a microfluidic device includes a channel within a substrate having a first sidewall and a second sidewall, and a channel length. A first module is disposed at an entry port of the channel and includes a first condenser including an entry port and an exit port. The condenser includes a first array of pillars disposed between the entry port and the exit port, wherein the first array of pillars are axisymetrically arranged along a first portion of the channel such that a bisection of the first array of pillars within the channel provides a mirror image of one half of the first array relative to the other half of the first array. The array of pillars in the condenser are configured to drive all particles within a fluid mixture towards a center of the channel, wherein the fluid mixture includes three or more different particle sizes. The first module also includes a first separator including an entry port fluidly coupled to the exit port of the first condenser and an exit port. The first separator includes a second array of pillars disposed between the entry port and the exit port along a second portion of the channel, wherein the second array of pillars is configured to form from the fluid mixture a streamline including the largest particle sizes to the first sidewall and a streamline of the smaller particles away from the first and second sidewalls. The microfluidic device further includes at least one additional module. The at least one additional module includes a second condenser including an entry port fluidly coupled to the exit port of the first separator and an exit port. The second condenser includes a third array of pillars disposed between the entry port and the exit port along a third portion of the channel, wherein the third array of pillars is axisymetrically arranged along the third portion such that a bisection of the third array of pillars within the channel provides a mirror image of one half of the third array relative to the other half of the third array and are configured to drive the streamline of the smaller particle sizes towards the center of the channel. A second separator includes an entry port fluidly coupled to the exit port of the second condenser and an exit port. The second separator includes a fourth array of pillars disposed between the entry port and the exit port along a fourth portion of the channel. The fourth array of pillars is configured to drive medium-sized particles in the streamline to the second sidewall and a streamline of smallest particles away from the first and second sidewalls such that the streamline of the largest particles, the streamline of the medium-sized particles, and the streamline of the smallest particles are at different locations at the exit port of the second separator.

In one or more embodiments of the present invention, a method of separating different sized particles from a fluid includes flowing a fluid mixture containing three or more different particle sizes into a multistage deterministic lateral displacement device. The multistage deterministic displacement device includes a channel including a first sidewall spaced apart from a second sidewall, a first module, and at least one additional module therein, wherein the first module includes a first condenser portion and a first separator portion, and the second module includes a second condenser portion and a second separator portion. The fluid mixture flows into the first condenser and forms a concentrated streamline of the three or more different particle sizes at a center of the channel. The streamline of the three or more different particle sizes at the center of the channel flows into the first separator portion and separates the largest particles from the streamline of the three or more different particle sizes to form a streamline of the largest particles along the first sidewall of the channel and a streamline of smaller particles between and away from the first and second sidewalls. The streamline of the largest particles along the first sidewall of the channel and the streamline of smaller particles between and away from the first and second sidewalls flows into the second condenser portion, which re-centers the streamline of the smaller particles to the center of the channel. The streamline of the largest particles flows along the first sidewall. The re-centered streamline of smaller particles and the streamline of the largest particles along the first sidewall flow into the second separator. The medium sized particles are separated from the streamline of smaller particles to form a streamline of the medium sized particles along a second sidewall of the channel. A streamline of smaller particles flows between and away from the first and second sidewalls, and the streamline of the largest particles flows along the first sidewall. The streamlines of the largest particles, the medium sized particles and the smaller particles are then collected from the second separator at different locations.

In one or more embodiments of the present invention, a method of forming a multistage deterministic lateral displacement device includes forming a channel, within a substrate, having a first sidewall, a second sidewall, a channel length, an inlet and an outlet. A first array of pillars is formed to define a first condenser portion proximate the inlet, the first array of pillars operative to drive a streamline of all particles in a fluid mixture including three or more particles sizes to a center of the channel. A second array of pillars is formed to define a first separator portion, the second array of pillars operative to receive the streamline of all particles and separate largest particles from the streamline of all particles to form a streamline of the largest particles towards the first sidewall and a streamline of smaller particles between the first and second sidewalls. The first condenser and the first separator define a first module. A third array of pillars is formed to define a second condenser portion, the third array of pillars operative to receive the streamline of smaller particles and drive the streamline of smaller particles to the center of the channel, wherein the streamline of the largest particles flows along the first sidewall. A fourth array of pillars is formed to define a second separator portion, the fourth array of pillars operative to receive the streamline of smaller particles and separate medium-sized particles to form a streamline of the medium-sized particles towards the second sidewall and a streamline of smaller particles less the medium sized particles between the first and second sidewalls. The second condenser and the second separator define a second module, wherein the streamline of the largest particles flow from the outlet along the first sidewall, the streamline of the medium-sized particles flow from the outlet along the second sidewall, and the streamline of the smaller particles less the medium sized particles flow from the outlet between the first and second sidewalls.

These and other features and advantages will become apparent from the following detailed description of illustrative embodiments thereof, which is to be read in connection with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

It will be appreciated that for simplicity and clarity of illustration, elements shown in the drawings have not necessarily been drawn to scale. For example, the dimensions of some of the elements can be exaggerated relative to other elements for purpose of clarity.

DETAILED DESCRIPTION

The present invention is generally directed to multistage deterministic lateral displacement (DLD) devices for separating particles according to at least three different particle sizes within a fluid. DLD is a technology that utilizes specific arrangements of pillars within a channel to precisely control the trajectory of and facilitate separation of particles larger and smaller than a critical diameter. Each succeeding row within a constriction is shifted laterally at a set distance from the preceding row, which leads to the creation of separate flow laminae containing different particle sizes that follow known paths through the device.

In one or more aspects of the present invention, the multistage DLD devices generally include a channel within a substrate that contains, in series, a first module and at least one additional module. Each module includes a condenser portion and a separator portion that serves to separate the larger particles from the smaller particles. The channel has a first and second sidewall and has a length effective to accommodate the first module and at least one additional module. In the condenser portion of the first module, there is an entry port and an exit port. Within the channel of the condenser portion is a first array of pillars that are disposed between the entry and exit ports along a first portion of the length of the channel. The first array of pillars are axisymmetrically arranged along the first portion of the channel length such that a bisection of the channel provides a mirror image of one half of the first array relative to the other half of the first array and are configured to focus all particles towards a center of the channel. The entry port receives a fluid containing a mixture of particles having three or more particle sizes and the exit port discharges the centrally located focused beam of particles to the separator portion. Concentration of particles in the condenser portion as described above is advantageous as it allows for a reduction in diffusion effects of diffusion, formation of narrow jets that can then be fed into the separators to achieve high resolution particle fractionation within a single channel, and increases the concentration of a sample, which can be useful for rare or highly diluted particle solutions that are often needed in a diagnostic applications.

In the separator portion, there is an entry port capable of receiving the concentrated and centrally located fluid from the condenser portion. Within the channel of the separator portion is a second array of pillars that are disposed between the entry and exit port along a second portion of the length of the channel. The arrangement of the second array of pillars in the separator portion drives the largest particles towards the first sidewall of the separator portion while smaller particle sizes flow within the channel away from the sidewall to an exit port of the separator where it enters the second module. As such, the first module separates the largest particle sizes from the smaller particles sizes, which can include both medium and small particles sizes. The second module separates the next largest particles sizes (i.e., the medium particles sizes) from the remaining smaller particles sizes in a similar manner as described above. In this manner, the multistage DLD device can separate more than two particle sizes as will be described in greater detail below.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

It will also be understood that when an element such as a layer, region or substrate is referred to as being "on" or "over" another element, it can be directly on the other element or intervening elements could also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements could be present. In contrast, when an element is referred to as being "directly connected" or "directly coupled" to another element, there are no intervening elements present.

It should be understood that use of descriptions such as top, bottom, left, right, vertical, horizontal, or the like, are intended to be in reference to the orientation(s) illustrated in the figures, and are intended to be descriptive and to distinguish aspects of depicted features without being limiting. Spatially relative terms, such as "beneath," "below," "lower," "above," "upper," and the like, could be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers could also be present.

It will be understood that, although the terms first, second, etc. could be used herein to describe various elements, these elements should not be limited by these terms. These terms are only used to distinguish one element from another element. Reference to first, second, third, etc., feature is intended to distinguish features without necessarily implying a particular order unless otherwise so stated or indicated. Thus, a first element discussed herein could be termed a second element without departing from the scope of the present concept.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Moreover, numerous specific details are set forth in the following description, such as particular structures, components, materials, dimensions, processing steps and techniques, in order to provide a thorough understanding of the present invention. However, it will be appreciated by one of ordinary skill in the art that the present invention can be practiced without these specific details. In other instances, well-known structures or processing steps have not been described in detail in order to avoid obscuring the present invention. Conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

It is to be understood that the present invention will be described in terms of a given illustrative architecture; however, other architectures, structures, substrate materials and process features and steps could be varied within the scope of the present invention.

It should also be noted that certain features could not be shown in all figures for the sake of clarity. This is not intended to be interpreted as a limitation of any particular embodiment, or illustration, or scope of the claims.

Figure 1:
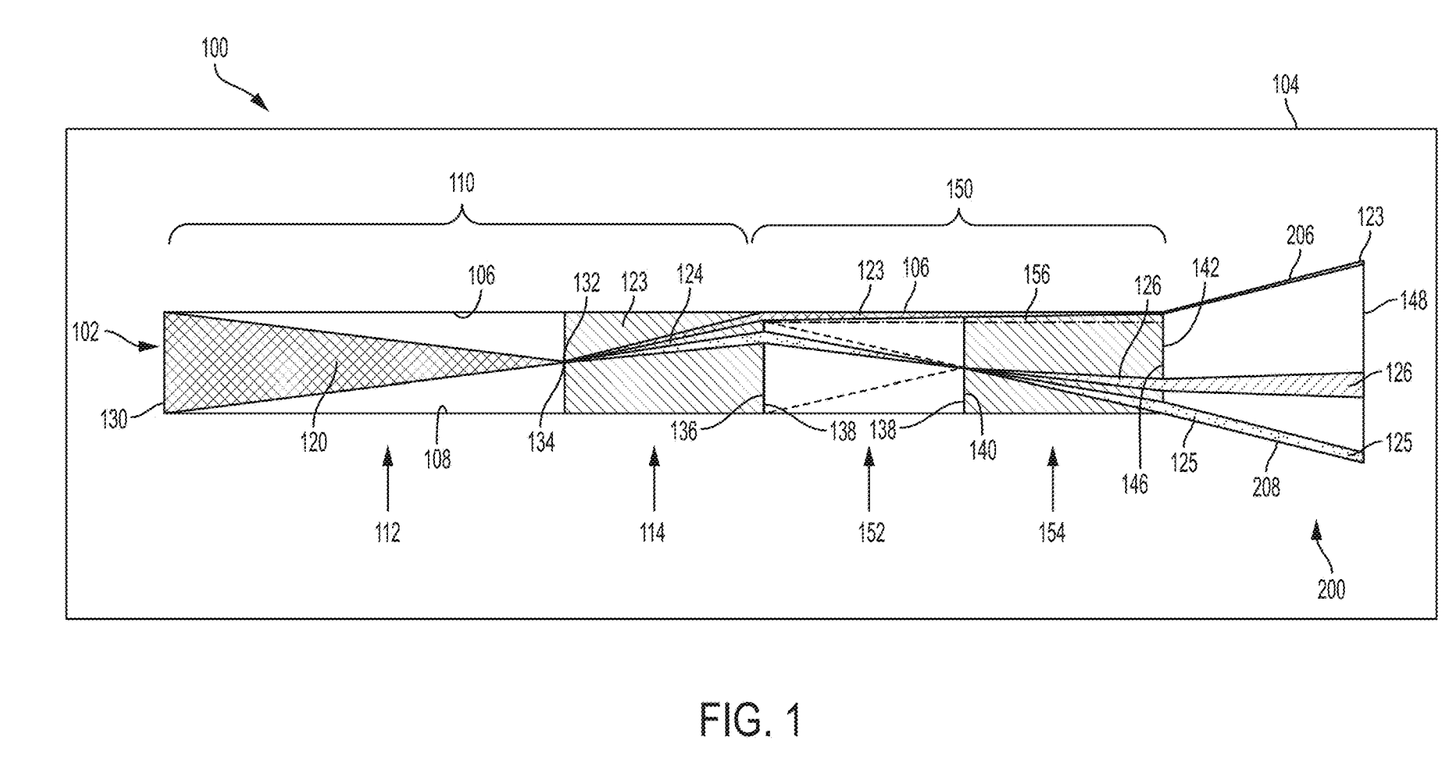
FIG. 1 is a schematic top down view depicting a multistage deterministic lateral displacement device in accordance with one or more embodiments of the present invention.

Referring now to the drawings in which like numerals represent the same or similar elements and initially to FIG. 1, a top down partial cut-away view of an exemplary embodiment of a multistage DLD device 100 is illustrated.

The multistage DLD device 100 generally includes a fluidic channel 102 formed on a substrate 104 that contains, in series, a first module 110 and at least one additional module 150 along a length of the channel. The fluidic channel 102 includes a first sidewall 106 spaced apart at an equal distance along the channel length from a second sidewall 108 that spans at least the length of the first and the at least one additional modules, 110, 150, respectively.

Each module 110, 150, includes a condenser portion 112, 152 and a separator portion, 114, 154, respectively as shown. A compartmental wall 156 is provided in the at least one additional module 150 in close proximity to the sidewall 106 to provide a secondary fluid pathway along the sidewall 106. In one or more embodiments, the compartment wall 156 corresponds to about 1/10th of a width dimension of the fluidic channel 102.

The multistage DLD device 100 can further include an optional exit portion 200 fluidly coupled to the separator portion 152 of the at least one additional module 150 to provide further discrimination between the different laminar fluid streams exiting the separator portion 152, which would be three when there is single additional module as each module provides binary separation. The sidewalls 206, 208 are divergent in the optional exit portion 200 relative to the sidewalls 106, 108 in the first and the at least one additional module 110, 150, respectively.

In operation, a fluid including a mixture 120 of particles sizes is introduced into an entry port 130 of the condenser portion 112 in the first module 110. As will be described in greater detail below, the array of pillars in the condenser 112 focuses the mixture 120 of particles having different particle sizes to a center of the channel 102 as shown, where it exits the condenser portion 112 via an exit port 132 and is then introduced into the separator portion 114 of the first module via an entry port 134.

The array of pillars in the separator portion 114 are arranged or patterned with a desired size, shape, and relative position to concentrate and drive the particles having the largest particle size stream, i.e., particles greater than the critical dimension, by displacement towards and along the first sidewall 106 to the exit port 136 of the separator portion 114. Because the large particles have a larger diameter or over-critical diameter, a streamline of large particles 123 bump through the off-shifted pillars and migrate along a bumping direction towards the first sidewall 106. A streamline of smaller particles 124 sizes including both the medium and small particles having particles sizes smaller than the critical dimension are not displaced and remain centered within the streamline 124 flowing through the separator portion 114. In other words, the smaller particles do not have an over-critical diameter, and, thus, migrate in a zig-zag shaped direction between pillars within the array. Due to the geometric parameters of the separator, the streamline of smaller particles 124 is separate from the streamline of the largest particles 123, which is away from sidewall 106.

The streamline of the largest particles 123 is displaced into the fluid pathway defined by the sidewall 106 and the compartment wall 156. In contrast, the streamline of medium and small particles sizes 124 is introduced into the array of pillars in condenser portion 152 via entry port 138, where the streamline of medium and small particles sizes 124 is re-directed to the center of the channel 102 within the second module 150.

The streamline of medium and small particles 124 is then introduced into the entry port 140 of the separator portion 154 in the second module 150. The array of pillars therein are arranged or patterned with a desired size, shape, and relative position to concentrate the largest particles within the streamline of medium and small particles sizes 124, which in the particular array of pillars in the separator 154 are configured to be larger than the critical dimension to form a streamline of the largest particles 125 (i.e., the medium sized particles in mixture 120) that is focused to the second sidewall 108 of the channel 102, wherein a streamline of the smallest particles 126 in the mixture 120 follow a zig-zag pattern between pillars and remain centered within the streamline provided by the array. The smallest particles are smaller than the critical dimension provided by the array of pillars in the separator 154.

The three different particle size streams 123, 125, and 126 can then be collected at different collection points at exit port 142 of the separator 154. The critical dimension at which a particle will enter displacement mode in the separator 114, 154 and the configuration of the array of pillars can be analytically determined as is known in the art.

Optionally, the multistage DLD device includes exit portion 200, wherein the sidewalls 206, 208 diverge relative to sidewalls 106, 108 to provide greater discrimination between the three different streamlines of particles sizes 123, 125, and 126 that were in the initial mixture 120. In this optional embodiment, the three different particle size streams from separator 154 flow into the exit portion via entry port 146. The streamline of largest particle sizes 123 remain focused along sidewall 106, the streamline of medium particle sizes 125 remain focused along sidewall 108, and the streamline of the smallest particle sizes 126 is focused within the channel 102 and away from sidewalls 206, 208, thereby creating a greater distance between the different streamlines at the exit port 148 of the exit portion 200, wherein the particles can be isolated and collected in accordance with three different particles sizes.

Figure 2:
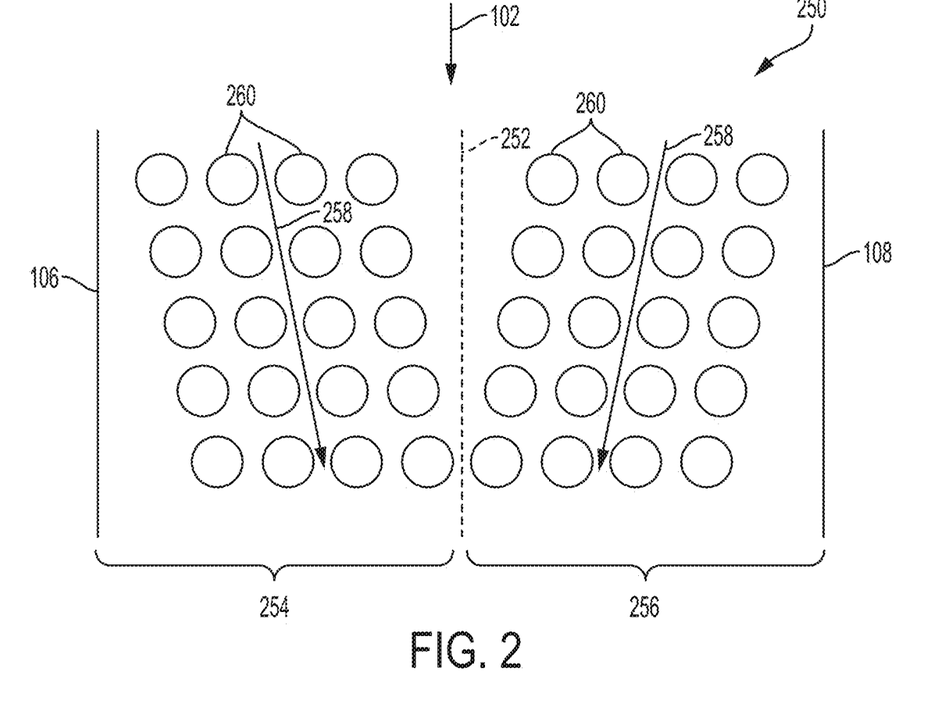
FIG. 2 is a schematic top view of an exemplary array of pillars for a condenser portion of a multistage deterministic lateral displacement device in accordance with one or more embodiments of the present invention.
Figure 3:
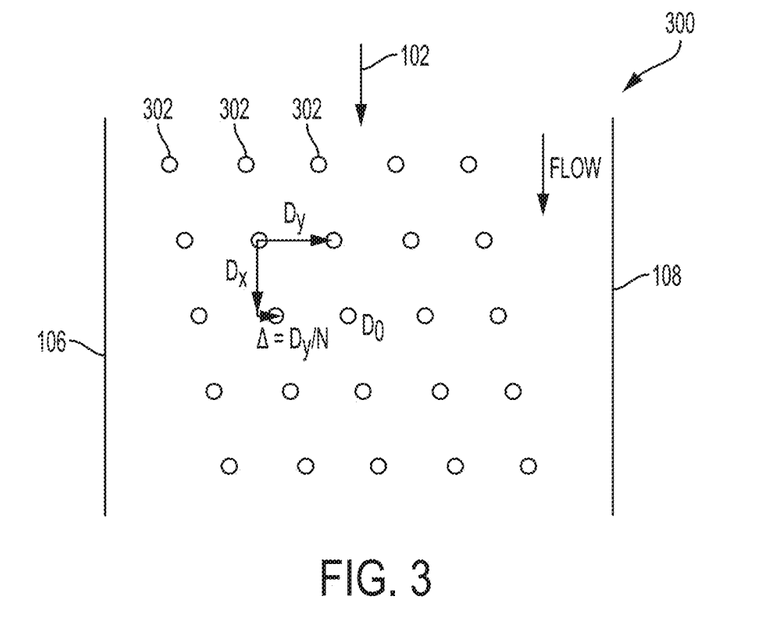
FIG. 3 is a schematic top view of an exemplary array of pillars for a separator portion of a multistage deterministic lateral displacement device in accordance with one or more embodiments of the present invention.

As noted above, each module 110, 150 includes a condenser portion 112, 152, respectively, and a separator portion 114, 154, respectively. An array of pillars is provided in each portion 112, 114, 152, 154. FIGS. 2-3 depict exemplary arrays of pillars for the condenser portions 112, 152 with a center focus as described above, and the separator portions 114, 154, respectively.

In FIG. 2, the condenser portions 112, 152 can include the illustrated array of pillars 250 with a center focus as shown. The array of pillars 250 are arranged between sidewalls 106 and 108 of the channel 102. The pillars 260 within the array 250 are axisymmetrically arranged along a portion of the channel length such that a bisection of the channel length as indicated by dotted line 252 provides a mirror image of one half of the array of pillars 254 relative to the other half array of the array of pillars 256. Each half of the array includes multiple rows of pillars that are laterally shifted relative to one another at a set distance. More particularly, relative to the flow direction 262 the left half of the array 254 is configured to shift all particles to the right as indicated by arrow 256 and the right half of the array 254 is configured to shift particles to the left as indicated by arrow 258 such that particles of different sizes are focused in the middle of the channel 102.

In FIG. 3, the separator portions 114, 154 can include the array of pillars 300 to separate the largest particles from the smaller particles as shown. The array of pillars 300 are arranged between sidewalls 106 and 108 of the channel 102. The pillars 302 within the array 300 include multiple rows of pillars that are laterally shifted relative to one another at a set distance. This leads to the creation of separate flow laminae which follow known paths through the separation portions. Particles smaller than a critical dimension remain within a first streamline influenced by drag force (FDrag) as it passes by a pillar and continues through the device in a zigzagged path. Particles that are larger than the critical dimension are continually displaced into the next streamline at each successive pillar, thus facilitating particle separation. As two particles traverse the length of the device, the distance between them becomes larger.

The pillars in both the condenser portions 112, 152 and the separator portions 114, 154 can include the following geometric parameters: a D0, a Dy, a Dx, a G, and a Δ, which are generally shown in FIG. 3. The D0 is a diameter of an individual pillar, which extends in a perpendicular orientation relative to the substrate. The Dx is a center to center distance between pillar centers substantially parallel to a fluid flow direction, and the Dy is the center to center distance between pillar centers substantially perpendicular to the flow direction. The G is a gap distance between pillars, which is the distance between the outer surfaces of two pillars, and the Δ is the offset displacement of a pillar with respect to another pillar in the flow direction. N is the row shift ratio (also referred to as the off-shift displacement), which shows the ratio of the pillar center distance (Dy) to the row-shift displacement (Δ), i.e. Dy/Δ. The critical dimension in the different arrays is generally controlled by the geometric parameters of the pillar array and the off-shift displacement (N).

In one or more embodiments, the geometric parameters of the pillars are uniform across the array of pillars with the proviso noted above that the condenser includes an array of pillars that are axisymmetrically arranged along a portion of the channel length such that the bisection produces a mirror image of one half of the array relative to the other half of the array so as to provide a center focus. In one or more embodiments, the pillars in the array can follow a similar size, shape, and arrangement as the pillars with the exception as it relates to the arrangement of pillar array in the condenser portion 112, 152.

In one or more embodiments, the D0/Dy ratio in the separator portions 114, 154 is less than or equal to 0.6 whereas the D0/Dy ratio in the condenser portions 112, 152 is greater than or equal to 0.6. When the D0/Dy is less than or equal to 0.6, the pillar array shifts the particle trajectory relative to fluid flow direction towards the channel sidewall that is based on particle size. However, when D0/Dy is greater than 0.6, the bumping particle, which has a larger radius than the critical diameter, has the same migration angle and is deflected toward one direction. In contrast, the smaller particles, which have a smaller critical diameter has a migration angle close to about 80% or greater of the bumping migration angle. As a result, in the condenser, when D0/Dy is greater than or equal to 0.6, the relatively big and small particles have roughly 80% of the bumping migration angle, which can be determined by the pillar structure and when N is the periodicity of pillars (which dictates the number of streamlines), the angle can be defined as arctan (1/N). In one or more embodiments, N can be from 3 to 1000.

As noted above, the condensers 112, 152 are utilized for focusing a particle mixture of different particle sizes to the center of the channel 102. In contrast, the separators 114, 154 are utilized for separating the particles by the size difference with an increased migration angle difference. The pillars within the different pillar arrays are constructed within the fluidic channel 102 in which a fluid flow of the mixture follows axially along the direction of the channel 102 (i.e. the flow direction 110), while a lattice translation vector follows along at an angle set by the geometric parameters of the pillars within the pillar array. This angle is referred to as the bumping angle. Should a particle be deflected by the array, the angle of the particle follows the bumping angle. If the particle is deflected by less than the bumping angle, it can be referred to as the migration angle. If a particle follows the flow stream in the channel 102, then its motion is called a zig-zag mode and its migration angle is effectively zero.

Figure 4:
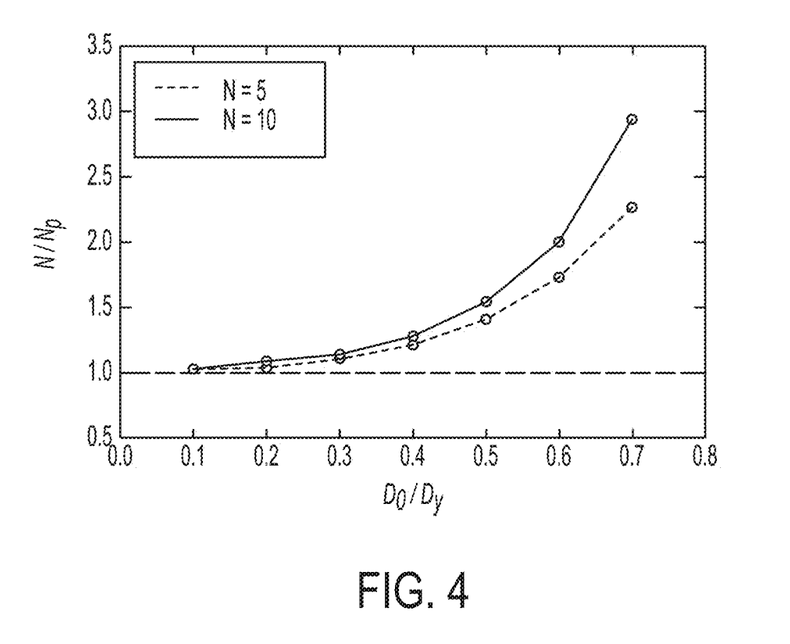
FIG. 4 graphically illustrates relative average periodicity as a function of a D0/Dy ratio for streamlines inside a multistage deterministic lateral displacement array.
Figure 5:
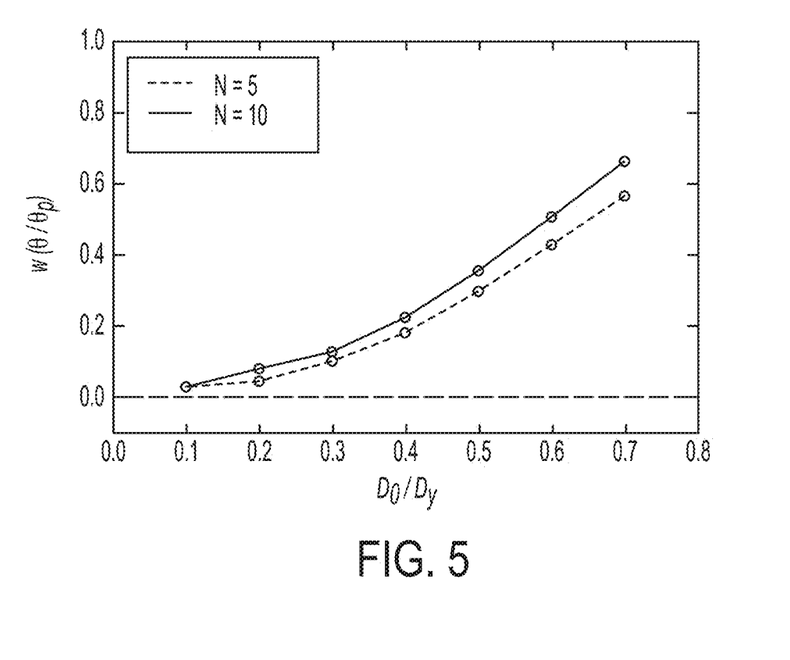
FIG. 5 graphically illustrates relative migration angle as a function of a D0/Dy ratio for streamlines inside a multistage deterministic lateral displacement array.

FIGS. 4 and 5 graphically illustrate the relative migration angle and average periodicity of the streamlines inside the DLD arrays with different pillar diameter (D0). The center to center distance of the pillars is Dy and N is the row shift ratio with the row-shift displacement (Δ) and $$N = \frac{D_y}{\Delta}.$$

As shown, the D0/Dy ratio of 0.6 generally comes from where the migration angle becomes about 50% of the full migration angle. This suggests that lower D0/Dy ratios for the condenser could be used but the efficiency of focusing is significantly degraded.

Figure 6:
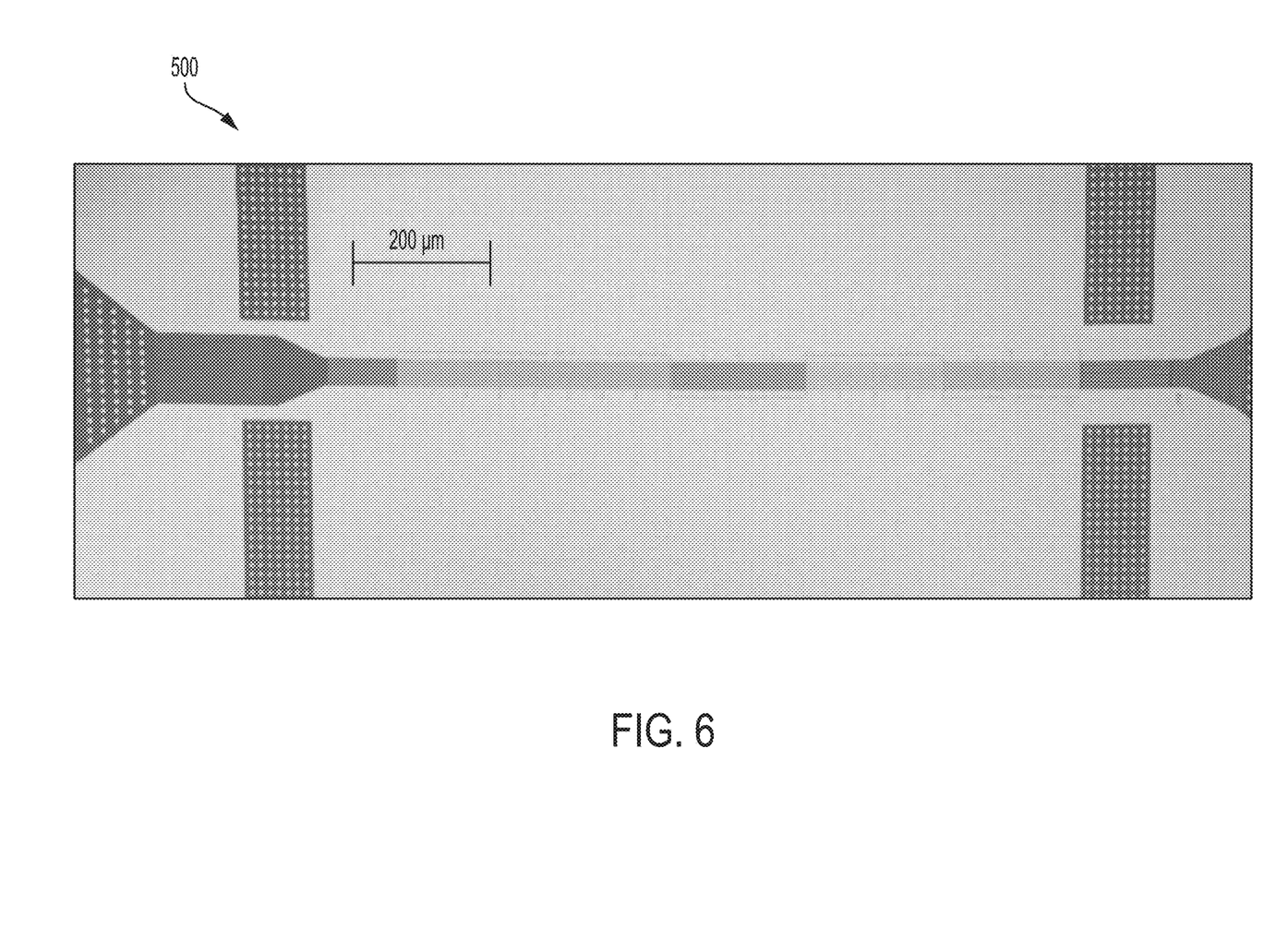
FIG. 6 is a scanning electron micrograph of a multistage deterministic lateral displacement device in accordance with one or more embodiments of the present invention.

FIG. 6 depicts a scanning electron micrograph of a multistage DLD device 500 fabricated on a substrate including a first module and a second module. Each module includes a condenser portion and a separator portion as is generally described above. Due to pillar density, each portion has a different intensity level.

Figure 7:
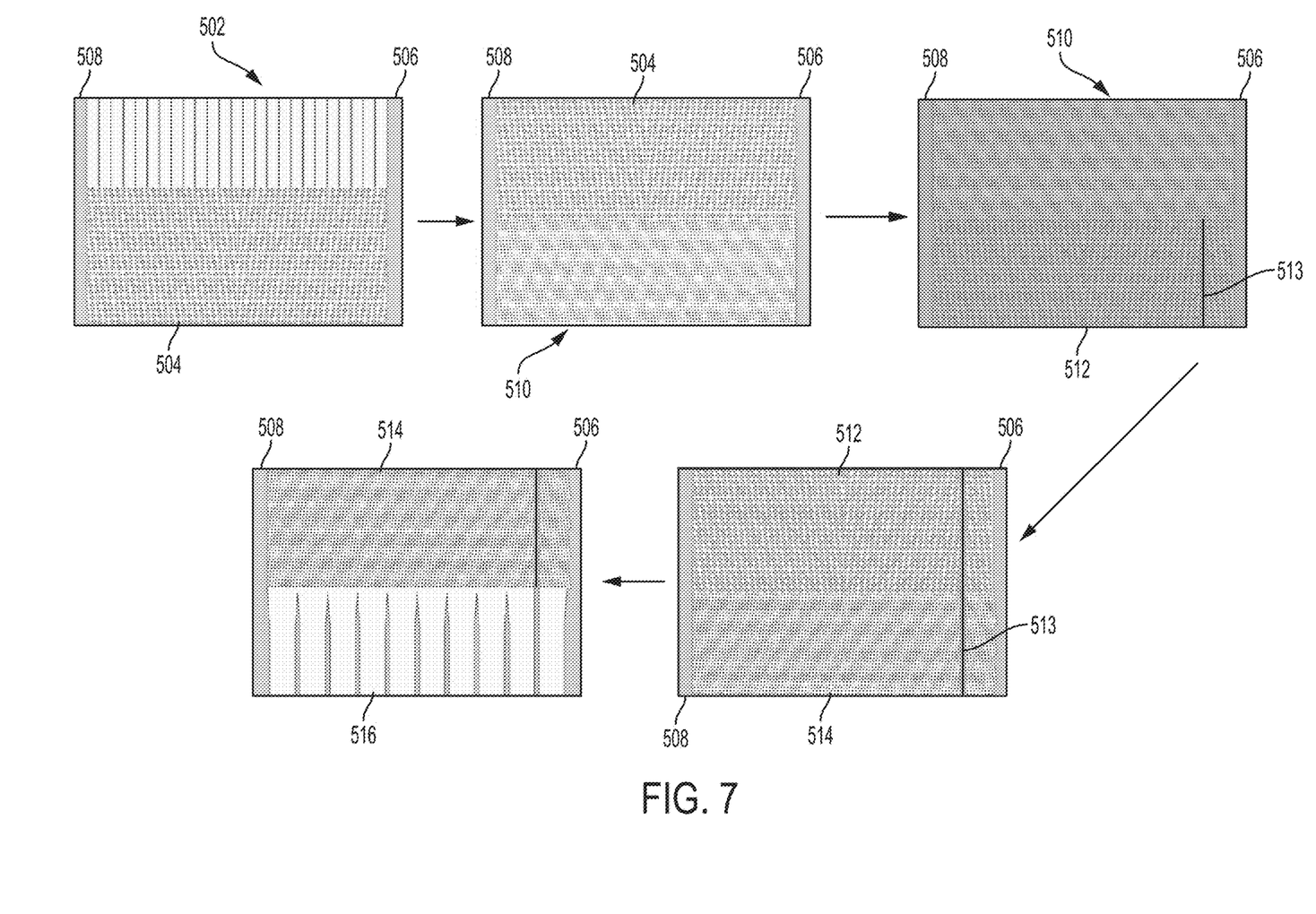
FIG. 7 are scanning electron micrograph of a various sections of a multistage deterministic lateral displacement device in accordance with one or more embodiments of the present invention.

FIG. 7 includes scanning electron images of the different portions sequentially arranged to define a multistage DLD device 500 of FIG. 6. The upper left hand image depicts an upper half including a plurality of fluid pathways 502 formed within a channel defined by sidewalls 506, 508 that are in fluid communication with a condenser portion 504 (lower half) of a first module as shown in the lower half of the micrograph. As noted above, the condenser portion 504 directs a streamline of all particles to the center of the channel, wherein it is introduced into the separator portion 510.

The second micrograph depicts the condenser portion 504 (upper half) in fluid communication with the separator portion 510 (lower half). The separator portion 510 separates the fluid mixture of particles by focusing a streamline containing the largest particles to the sidewall 506 and a streamline containing smaller particles, e.g., medium and small particles away from the sidewall into the second module.

In the third micrograph, the streamline containing the smaller particles is introduced into the second condenser 512 of the second module, the streamline containing the small particles is re-centered to the center of the channel. The streamline containing the largest particles is directed to the fluid pathway defined by compartmental wall 513 in the second wall.

In the fourth micrograph, the separator 514 is depicted in the lower half thereof. The separator 514 receives the re-centered streamline of both medium and small particles from the condenser 512 and further separates the mixture. The separator focuses a streamline containing the largest particles (i.e., the medium sized particles) to sidewall 508 and focuses a streamline containing the smallest particles away from the sidewall 508.

In the last micrograph, the three different streamlines are discharged from the separator at exit port 516. The streamline containing the largest particles flows within the fluid pathway defined by sidewall 506 and compartmental wall 513; the streamline containing the medium sized particles is focused along sidewall 508, and the streamline containing the smallest particles is spaced apart from the sidewalls 506, 508.

Figure 8:
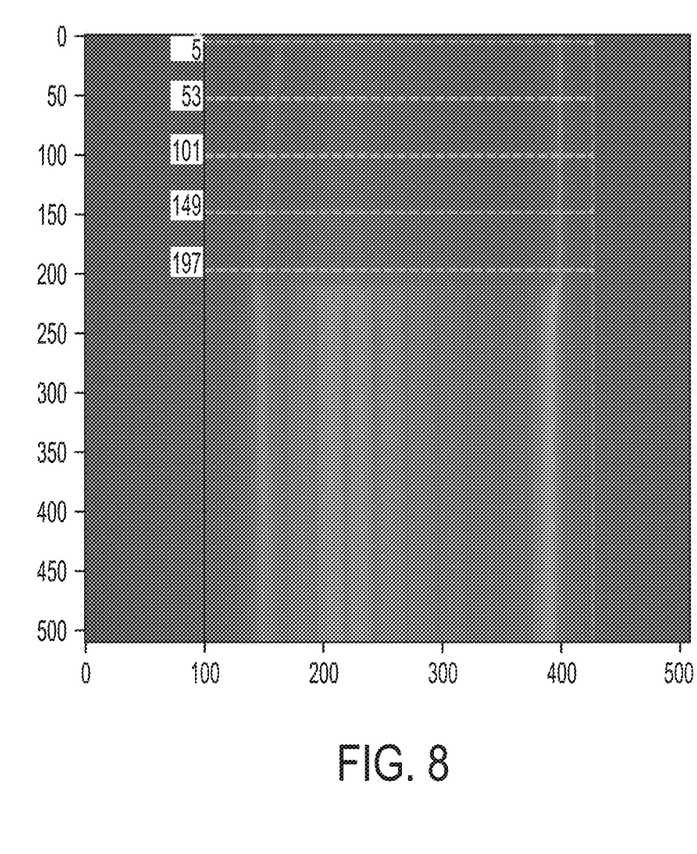
FIG. 8 is a fluorescent microscopic top down image of the second separator portion of a multistage deterministic lateral displacement device showing three different streamlines from a fluid mixture containing 0.5 kb, 1 kb, 10 kb DNA in accordance with one or more embodiments of the present invention.
Figure 9:
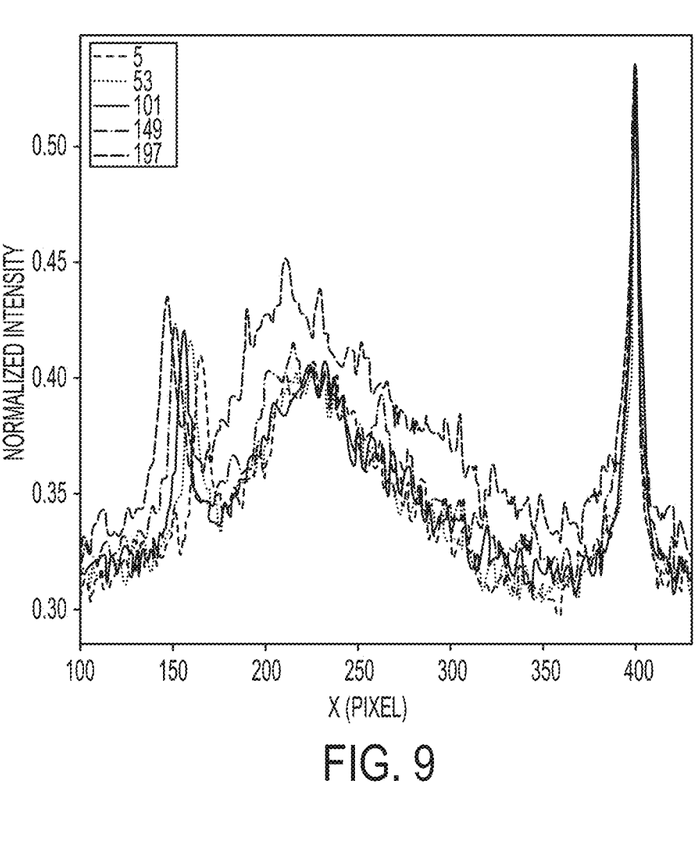
FIG. 9 graphically illustrates output separation data for a fluid mixture containing 0.5 kb, 1 kb, 10 kb DNA introduced into a multistage deterministic lateral displacement device in accordance with one or more embodiments of the present invention.

By way of example, 500 bp, 1 kb, 10 kb ds-DNA was injected in one channel as mixed at a pressure of 0.5 bar and goes through the multi-stage DLD device as is generally shown in FIG. 1. The first condenser in the first module had a pitch distance (Dy) of 800 nm and a gap distance (G) of 230 nm. The first separator portion array had a pitch distance (Dy) of 400 nm and a gap distance (G) of 230 nm with a pillar diameter (D0) of 170 nm. The second condenser had a gap distance (G) of 140 nm and a pitch distance (Dy) of 800 nm, and the second separator had pitch distance (Dy) of 400 nm, a gap distance (G) of 140 nm, and a pillar diameter (D0) of 250 nm, and in all arrays N=10. The pillar diameter (D0) is Dy−G. Therefore, in first condenser D0=570 nm and in second condenser D0=660 nm. FIGS. 8 and 9 shows the resulting separation. In FIG. 6, fluorescent images at the exit of the multistage DLD device shows three distinct streamlines. Streamlines are provided along each sidewall and within the channel away from the sidewalls. FIG. 9 provides a particle analysis of the different streamlines showing effective discrimination there between for separation of the different particle sizes.

The multistage deterministic lateral displacement array devices described above can be can be fabricated from microfabrication techniques such as, for example, techniques conventionally used for silicon-based integrated circuit fabrication, embossing, casting, injection molding, and so on. Examples of suitable fabrication techniques include photolithography, electron beam lithography, imprint lithography, reactive ion etching, wet etch, laser ablation, embossing, casting, injection molding, and other techniques. The multistage deterministic lateral displacement array devices can be fabricated from materials that are compatible with the conditions present in the particular application of interest. Such conditions include, but are not limited to, pH, temperature, application of organic solvents, ionic strength, pressure, application of electric fields, surface charge, sticking properties, surface treatment, surface functionalization, and bio-compatibility. The materials of the device are also chosen for their optical properties, mechanical properties, and for their inertness to components of the application to be carried out in the device. Such materials include, but are not limited to, polydimethylsiloxane (PDMS), glass, fused silica, silicone rubber, silicon, ceramics, and polymeric substrates, e.g., plastics, depending on the intended application. Devices can be coated with a fluorosilicate vapor and sealed by glass coverslips coated with polydimethylsiloxane (PDMS) on the sealing surface. The multistage deterministic lateral displacement devices can be placed into a plexiglass chuck for loading and application of pressures.

Technical benefits include the asymmetric flow profile of streamlines containing different particles sizes due to the array of pillars. The geometry of the array of pillars (e.g. pitch, pillar size, lattice constants) determines to what extent a pillar array will be able to separate larger particles from smaller particles. Tuning the geometric parameters of the array allows a designed arrays that either can separate larger particles from smaller particles as provided in the separator portions, or which focus all particle paths to a center of the channel as provided in the condenser portions. Concentration of the particles allows (1) reducing the effects of diffusion, (2) formation of narrow streamlines which can then be fed into separators to achieve high resolution particle fractionation, all in a single channel, and (3) increases the concentration of a sample, which can be useful for rare or highly diluted particle solutions needed in a diagnostic.

Additional technical benefits include utilizing a two stage approach that is advantageous because the separation efficiency depends on the cross-section of the particle jet. Diffusion ultimately limits the resolution of a separator array; the more narrow a particle jet injected into a separator, the more time (spatial extend) is available to separate the particle streams. By tuning the condenser as described above, narrow particle streamlines can be made such that there is no overlap between the bumped (large particle) and zig zag mode (small particle) jets in the separator device, leading to high resolution and optimum performance. Using condenser geometry simplifies this jet formation process, allowing a smaller device footprint and thus larger scale integration (higher device density).

Additional technical benefits include the combined effect of focusing an entire particle flux to the one side of the array of pillars inn the separator portions, effectively concentrating the largest sized particles in the fluid mixture to a narrow volume. The advantage to this is the ability to concentrate particles of all sizes into narrow streamline without having to use any additional input fluid or pressure. Current methods require stream focusing to generate this narrow stream which includes a concentrated particle jet which requires at least one or two additional input flows which require balancing of the pressures between the particle flow and the input flows. Therein lays a difficulty of scaling and controlling these multiple flows, especially for large scale, parallel device integration.

While the present invention has been particularly shown and described with respect to preferred embodiments, it will be understood by those skilled in the art that the foregoing and other changes in forms and details can be made without departing from the spirit and scope of the invention. It is therefore intended that the present invention not be limited to the exact forms and details described and illustrated but fall within the scope of the appended claims.

What is claimed is:

1. A microfluidic device comprising:
a channel within a substrate, the channel having a first sidewall, a second sidewall, and a channel length;
a first module at an entry port of the channel comprising:
a first condenser comprising an entry port and an exit port, a first array of pillars disposed between the entry port and the exit port, wherein the first array of pillars are axisymmetrically arranged along a first portion of the channel such that a bisection of the first array of pillars within the channel provides a mirror image of one half of the first array relative to the other half of the first array and are configured to drive all particles within a fluid mixture towards a center of the channel, wherein the fluid mixture comprises three or more different particle size ranges; and
a first separator comprising an entry port fluidly coupled to the exit port of the first condenser and an exit port, and a second array of pillars disposed between the entry port and the exit port along a second portion of the channel, the second array of pillars configured to form from the fluid mixture a first streamline including first particles that are in a first one of the particle size ranges to the first sidewall and a second streamline including second particles that are in a second one of the particle size ranges away from the first and second sidewalls; and
at least one additional module comprising:
a second condenser comprising an entry port fluidly coupled to the exit port of the first separator and an exit port, a third array of pillars disposed between the entry port and the exit port along a third portion of the channel, wherein the third array of pillars are axisymmetrically arranged along the third portion such that a bisection of the third array of pillars within the channel provides a mirror image of one half of the third array relative to the other half of the third array and are configured to drive the streamline of the second particles towards the center of the channel; and
a second separator comprising an entry port fluidly coupled to the exit port of the second condenser and an exit port, and a fourth array of pillars disposed between the entry port and the exit port along a fourth portion of the channel, the fourth array of pillars configured to drive third particles that are in a third one of the particle size ranges in the streamline of the second particles to the second sidewall and a streamline of second particles away from the first and second sidewalls such that the streamline of the largest particles, the streamline of the medium-sized particles, and the streamline of the smallest particles are at different locations at the exit port of the second separator; and
an exit portion fluidly coupled to the exit portion of the second separator portion, wherein the exit portion has an entry and exit ports, and first and second sidewalls contiguous with the first and second sidewalls, respectively, of the channel, wherein the first and second sidewalls of the exit portion diverge relative to the first and second sidewalls of the channel at an angle effective to increase a distance of the locations of the streamline of the largest particles, the streamline of the medium-sized particles, and the streamline of the smallest particles.

2. The microfluidic device of claim 1, further comprising a compartmental wall extending a length of the second module to define a fluid pathway between the compartmental wall and the first sidewall such that the streamline of the largest particles flows therein.

3. The microfluidic device of claim 1, wherein the first, second, third, and fourth pillar arrays comprise pillar diameters ($D_0$) from 10 nanometers (nm) to 1,000 nm at a pitch distance ($D_y$) greater than 200 nm.

4. The microfluidic device of claim 1, wherein the first and second condensers have a $D_0/D_y$ ratio greater than or equal to 0.6 and the first and second separators have a $D0/D_y$ ratio less than or equal to 0.6.

5. The microfluidic device of claim 1, wherein each additional module separates an additional particle size from the fluid mixture.

6. The microfluidic device of claim 1, wherein the largest, medium-sized and smallest particle sizes are less than 20 nm.

7. The microfluidic device of claim 1 further comprising a compartmental wall extending a length of the second module to define a fluid pathway between the compartmental wall and the first sidewall.

8. A method of separating at least three different sized particles from a fluid mixture, the method comprising:
flowing a fluid mixture containing three or more different particle sizes into a multistage deterministic lateral displacement device comprising a channel including a first sidewall spaced apart from a second sidewall, a first module, and at least one additional module therein, wherein the first module comprises a first condenser portion and a first separator portion, and the second module comprises a second condenser portion and a second separator portion;
flowing the fluid mixture into the first condenser and forming a concentrated streamline of the three or more different particle sizes at a center of the channel;
flowing the streamline of the three or more different particle sizes at the center of the channel into the first separator portion and separating the largest particles from the streamline of the three or more different particle sizes to form a streamline of the largest particles along the first sidewall of the channel and a streamline of smaller particles between and away from the first and second sidewalls;
flowing the streamline of the largest particles along the first sidewall of the channel and the streamline of smaller particles between and away from the first and second sidewalls into the second condenser portion and re-centering the streamline of smaller particles to the center of the channel and the streamline of the largest particles along the first sidewall;
flowing the re-centered streamline of smaller particles and the streamline of the largest particles along the first sidewall into the second separator and separating medium sized particles from the streamline of smaller particles and form a streamline of the medium sized particles along a second sidewall of the channel, a streamline of smaller particles between and away from the first and second sidewalls, and the streamline of the largest particles along the first sidewall; and collecting the streamlines of the largest particles, the medium sized particles and the smaller particles from the second separator at different locations.

9. The method of claim 8, wherein the three or more different particle sizes are less than 20 nm.

10. The method of claim 8, wherein the first and second condenser portions comprise an array of pillars axisymmetrically arranged along portions of the channel such that a bisection of the channel provides a mirror image of one half of the array relative to the other half of the array and are configured to drive all particle sizes towards the center of the channel.

11. The method of claim 8, wherein the first and second condenser portions and the first and second separator portions comprise an array of pillars having pillar diameters (D0) from 10 nanometers (nm) to 1,000 nm and a pitch distance ($D_y$) between pillars greater than 200 nm.

12. The method of claim 10, wherein the streamline of the largest particles along the first sidewall flow into a fluid pathway between a compartmental wall and the first sidewall of the channel extending along a length of the second module.

13. The method of claim 8, wherein the first and second condensers have a $D0/D_y$ ratio greater than or equal to 0.6 and the first and second separators have a $D0/D_y$ ratio less than or equal to 0.6.

14. The method of claim 8, wherein the first separator portion comprises an array of pillars having a critical dimension and the largest particles have a particle size greater than the critical dimension whereas the smaller particles have a particles size less than the critical dimension.

15. The method of claim 8, wherein the second separator portion comprises an array of pillars having a critical dimension and the medium sized particles have a particle size greater than the critical dimension whereas the smaller particles have a particles size less than the critical dimension.

16. A method of forming a multistage deterministic lateral displacement device, the method comprising:

forming a channel, within a substrate, having a first sidewall, a second sidewall, a channel length, an inlet and an outlet;

forming a first array of pillars to define a first condenser portion proximate the inlet, the first array of pillars operative to drive a streamline of all particles in a fluid mixture comprising three or more particles sizes to a center of the channel;

forming a second array of pillars to define a first separator portion, the second array of pillars operative to receive the streamline of all particles and separate largest particles from the streamline of all particles to form a streamline of the largest particles towards the first sidewall and a streamline of smaller particles between the first and second sidewalls, wherein the first condenser and the first separator define a first module;

forming a third array of pillars to define a second condenser portion, the third array of pillars operative to receive the streamline of smaller particles and drive the streamline of smaller particles to the center of the channel, wherein the streamline of the largest particles flows along the first sidewall; and forming a fourth array of pillars to define a second separator portion, the fourth array of pillars operative to receive the streamline of smaller particles and separate medium-sized particles to form a streamline of the medium-sized particles towards the second sidewall and a streamline of smaller particles less the medium sized particles between the first and second sidewalls, wherein the second condenser and the second separator define a second module, wherein the streamline of the largest particles flow from the outlet along the first sidewall, the streamline of the medium-sized particles flow from the outlet along the second sidewall, and the streamline of the smaller particles less the medium sized particles flow from the outlet between the first and second sidewalls;

forming an exit portion fluidly coupled to the exit portion of the second separator portion, wherein the exit portion has an entry and exit ports, and first and second sidewalls contiguous with the first and second sidewalls, respectively, of the channel, wherein the first and second sidewalls of the exit portion diverge relative to the first and second sidewalls of the channel at an angle effective to increase a distance of the locations of the streamline of the largest particles, the streamline of the medium-sized particles, and the streamline of the smallest particles.

17. The method of claim 16, wherein the second of array of pillars in the first separator portion are configured to provide a critical dimension greater than a particle size of the largest particles, and wherein the fourth array of pillars in the second separator portion are configured to provide a critical dimension greater than a particle size of the medium-sized particles.

18. The method of claim 16, wherein the first and second condensers have a $D0/D_y$ ratio greater than or equal to 0.6 and the first and second separators have a $D0/D_y$ ratio less than or equal to 0.6.

19. The method of claim 16, wherein the first and third arrays of pillars of the first and second condenser portions are axisymmetrically arranged such that a bisection of the channel provides a mirror image of one half of the array relative to the other half of the array and are configured to drive all particle sizes towards the center of the channel.

* * * * *